United States Patent Office 3,044,323
Patented July 17, 1962

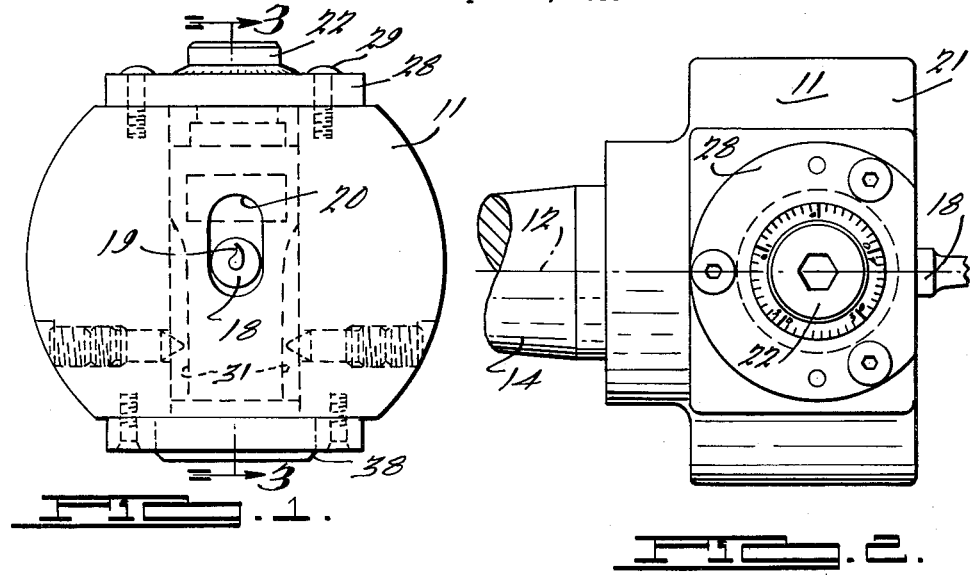

3,044,323
ADJUSTABLE BORING HEAD
Allen N. Sweeny, Grosse Pointe, Mich., assignor to De Vlieg Machine Company, Royal Oak, Mich., a corporation of Michigan
Filed Sept. 21, 1959, Ser. No. 841,287
7 Claims. (Cl. 77—58)

This invention relates to boring tools and more particularly to an adjustable boring head of the type commonly known as an offset boring head.

Boring heads of the type to which the present invention relates customarily comprise a body member which is rotated by a machine tool spindle. A shank which carries the cutting tool is supported by the body member and is adapted to have its axis offset from the axis of rotation of the body member. This is generally accomplished by a slide or the like which carries the shank and which may be adjusted transversely of the axis of rotation of the body member. In such boring tools, it is imperative that the slide does not change its angular position throughout its adjustment and that the axis of the shank carrying the cutting tool remains at all times parallel to the axis of rotation. To assure the maintenance of these conditions, it has heretofore been necessary to use involved and costly manufacturing techniques in which each tool is manufactured on a custom basis. It is, therefore, an object of the present invention to provide an offset boring head which possesses an extremely high degree of accuracy, yet which may be relatively inexpensively manufactured from production parts.

It is another object of the present invention to provide an adjustable boring head of the above character having means by which the angular position of the slide may be readily adjusted to maintain the axis of the shank carrying the cutting tool in accurate alignment with the axis of rotation of the head throughout the adjustment of the slide transversely of the axis of rotation.

It is still another object of the present invention to provide an adjustable boring head which possesses rigidity and strength of construction and which may be adjusted from time to time to compensate for any wear or looseness in the fit of certain of its operating parts.

These and other objects of the invention will become apparent from the following detailed description, taken in conjunction with the accompanying drawings wherein:

FIGURE 1 is an end elevational view of an adjustable boring head embodying the principles of the present invention;

FIG. 2 is a side elevational view of the structure illustrated in FIG. 1;

FIG. 3 is a sectional view of the structure illustrated in FIG. 1 taken along the line 3—3 thereof;

FIG. 4 is a sectional view of the structure illustrated in FIG. 3 taken along the line 4—4 thereof; and FIG. 5 is a fragmentary sectional view of the structure illustrated in FIG. 4 taken along the line 5—5 thereof.

Referring now to the drawings, the boring head will be seen as including a body member 11 adapted to be rotated about its longitudinal axis 12. The body member 11 preferably possesses a cylindrical outer contour and is provided with a rearwardly open threaded and shouldered socket 13. A fragmentarily illustrated bar 14 is shown threaded into the socket and is adapted to be secured at its other end in the spindle of the machine tool (not shown) for rotation about its longitudinal axis. The boring head is provided with a through bore 15 disposed forwardly of the socket 13 and transversely of the axis of rotation 12. A slide 16 of generally cylindrical form is snugly but slidably fitted within the bore 15 for adjustment in the direction of the axis of the bore 15. The slide is provided with a socket 17 for the reception of the rear end of a shank 18 carrying a single-point cutting tool 19 on the forward end thereof. The head has a slot 20 open to the front face 21 thereof and communicating with the bore 15, which is of sufficient length to freely accommodate the shank 18 throughout the length of adjustment of the slide 16.

The slide 16 is intended to be axially but non-rotatably adjusted in its bore 15, thus maintaining the axis of the shank 18 parallel to the axis of rotation 12 at all times. Measured adjustment of the slide 16 is made by means of an adjusting member 22 having a graduated dial portion 23 and an inwardly projecting threaded stud portion 24. The threaded portion 24 threadably engages in a threaded bore 25 at one end of the slide 16. The adjusting member 22 is rotatable but is held against movement axially of the bore 15 by virtue of the fact that a collar portion 26 thereof is snugly but rotatably secured between a ground face 27 on one side of the head and the shoulder of an angular retainer member 28 secured to the face 27 by any suitable means, such as cap screws 29. Thus, upon rotation of the adjusting member 22 the slide 16, which is non-rotatable, is shifted axially within the bore 15.

The angular position of the slide 16 throughout the length of its adjustment is maintained and controlled by means including a pair of parallel keyways 30 formed on diametrically opposite sides of the slide 16 and extending lengthwise thereof. Each keyway includes an inclined wall portion 31 which is disposed parallel to the axis of the bore 15 and is adapted to be engaged by the tapered or frusto-conically shaped end portions 32 of a pair of oppositely disposed adjusting members or keys 33 of cylindrical outer contour. The keys 33 are integrally formed with screws 34, which are threaded into threaded bores 35 provided in the head 11 on opposite sides of the bore 15. The bores 35 have unthreaded, reduced diameter portions 36 communicating with the bore 15 and in which the keys 33 are snugly slidable. The screws 34 are of the socket head type and may be turned by a suitable wrench to advance or retract the end portions 32 of the keys toward or away from the walls 31. It will be noted that the axes of the keys 33 are aligned and that said axes are offset from the diameter of the slide 16. By this means, the end portions 32 engage the sides 31 of the keyways 30 prior to engaging the bottom wall or opposite side wall of the keyways 30. Thus, by retracting one of the screws 34 and advancing the other of the screws 34, the angular position of the slide 16 in its bore 15 may be adjusted a limited amount. The angle of inclination of the tapered or conically shaped end portions 32 is the same as the angle of inclination of the keyway walls 31 and thus line contact will always be maintained between the end portions 32 and the walls 31 at any adjusted position of the screws 34. Additionally, when through long usage, the keyways 30, the bore 15 or the slide 16 become worn, any slack or looseness in the fit may be taken up by inward adjustment of the screws 34. In view of the fact that the walls 31 are parallel to the axis of the bore 15, the fit between the end portion 32 and the wall 31 will be maintained throughout the length of adjustment of the slide 16. The screws 34 are adjusted to a position in which the end portions 32 contact but do not clamp or bind against the walls 31 to permit sliding movement of the slide 16, yet prevent angular or rotational movement thereof. Once the screws 34 have been correctly positioned, they may be maintained in that position by suitable locking means, such as locking set screws 37. The screws 34 are, of course, positioned so that the shank 18 carried by the slide will be maintained parallel to the axis of rotation 12 and this parallelism maintained throughout the adjustment of the slide 16.

It will, of course, be appreciated that if the shank 18 on which the cutting tool 19 is supported is not held parallel to the axis of rotation of the tool, considerable inaccuracy in the work produced will result. In adjustable boring heads previously used, complicated and exacting machining operations had to be performed within the bore 15 and on the slide 16 to assure proper alignment of the slide. In addition, the bore 17 had to be located with great accuracy. Frequently, the keys and keyways in the bore 15 and on the slide 16 had to be formed first and then the bore 18 formed with the slide in place within the head in order to assure the correct location thereof. The present invention eliminates the need for such costly and exacting machining operations and permits interchangeability of parts and the more extensive use of mass manufacturing techniques. Irrespective of slight variations in positioning of the keyways 30 or the distances between the walls 31, proper adjustment of the keys 33 will assure proper axial alignment of the shank 18.

The purpose of adjusting the slide 16 transversely to the axis of rotation of the tool is, of course, to establish the diameter of the bore to be finished by the use of the tool. Once such an adjustment of the slide is made by rotation of the adjusting member 22, the slide is locked in position by means of a locking screw 38 engaged in a threaded bore 39 at the opposite end of the slide 16 from the adjusting member 22. The locking screw 38 is of the socket head type and may be loosened for adjustment of the slide and thereafter tightened to clamp the slide in place. In addition, the screw 38 has a small central through bore 40 to provide access to a small set screw 41 threaded into a threaded, reduced diameter extension 42 of the bore 39. The set screw 41 is threaded against the side of the shank 18 to clamp it in place within its socket 17.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In an adjustable boring head, a body member having a transverse opening, a slide supported in said opening for angular adjustment about a given axis and for rectilinear adjustment along said axis, means on said slide for supporting a cutting tool, a pair of wall portions on said slide extending parallel to said axis, a pair of adjustable members carried by said body member, said adjustable members being individually adjustable toward and away from said wall portions for fixing the angular position of said slide, and means for holding said adjustable members in a selected position while permitting rectilinear adjustment of said slide along said axis.

2. In an adjustable boring head, a body member having a transverse opening, a slide supported in said opening for angular adjustment about a given axis and for rectilinear adjustment along said axis, means on said slide for supporting a cutting tool, a pair of wall portions on said slide disposed parallel to said axis, a pair of adjusting keys adjustable in and out of engagement with said wall portions for fixing the angular position of said slide, and means for securing said adjusting keys in a selected position without restricting movement of said slide along said axis, said keys and said wall portions being so arranged that upon attempted rotation of said slide in one direction one of said wall portions will abut one of said keys and upon attempted rotation of said slide in the opposite direction the other of said wall portions will abut the other of said keys.

3. In an adjustable boring head, a body member having a bore formed therein, a slide snugly but slidably disposed in said bore for adjustment about and along the axis of said bore, means on said slide for supporting a cutting tool, a pair of spaced wall portions on said slide disposed parallel to the axis of said bore, a pair of adjusting keys carried by said body member, each of said adjusting keys being adjustable in and out of engagement with one of said wall portions to establish the angular position of said slide in said bore, means for holding said adjusting keys in a selected position without restricting movement of said slide along said axis, and threaded means associated with said slide for moving said slide axially in said bore upon the rotation thereof.

4. In an adjustable boring head, a body member having a bore, a slide snugly but slidably disposed within said bore for adjustment about and along the axis of said bore, a shank carried by said slide perpendicular to the axis of said bore and adapted to support a cutting tool, a pair of spaced wall portions on said slide disposed parallel to the axis of said bore, a pair of adjusting keys carried by said body member, each of said adjusting keys being advanceable toward and retractable from a separate one of said wall portions for establishing the alignment of said shank, means for holding said adjusting keys in selected positions thereof without restricting movement of said slide along said axis, and means for axially shifting the position of said slide in said bore.

5. In an adjustable boring head, a body member having a bore, a slide snugly but slidably disposed within said bore for adjustment about and along the axis of said bore, means on said slide for supporting a cutting tool, said slide having a pair of oppositely disposed keyways, each of said keyways having an inclined wall portion, a pair of oppositely disposed adjustable keys carried by said body member, each of said keys being adjustable in and out of engagement with the inclined wall portion of one of said keyways, whereby the angular position of said slide in said bore may be changed by retracting one of said keys away from its associated wall portion and advancing the other of said keys in the direction of its associated wall portion, means for holding said adjustable keys in selected positions without restricting movement of said slide along said axis, and means for shifting said slide axially in said bore.

6. In an adjustable boring head, a body member having a bore, a slide snugly but slidably disposed within said bore fore adjustment about and along the axis of said bore, means on said slide for supporting a cutting tool, a pair of spaced, outwardly open wall portions on said slide disposed parallel to the axis of said bore, a pair of keys carried by said body member, each of said keys being nonperpendicularly adjustable relative to one of said wall portions upon the rotation thereof, said keys having tapered ends adapted to make line contact with said wall portions for maintaining the angular position of said slide in said bore constant during axial sliding movement of said slide in said bore, and means for holding said keys in selected positions without restricting movement of said slide along said axis.

7. In an adjustable boring head, a body member having a transverse bore therein, a slide snugly but slidably disposed in said bore, means on said slide for supporting a cutting tool, a pair of outwardly open, spaced wall portions on said slide disposed parallel to the axis of said bore, said body member having a pair of threaded bores communicating with said transverse bore in juxtaposition to said spaced wall portions, a pair of threaded keys engage one in each one of said threaded bores, said keys being adjustable toward and away from said wall portions upon the rotation thereof to angularly position said slide in said bore, whereby said slide may be axially but non-rotatably shifted in said bore, and means for securing said keys in selected positions without restricting axial movement of said slide in said bore.

References Cited in the file of this patent
UNITED STATES PATENTS

| | | |
|---|---|---|
| 2,393,777 | Hughes et al. | Jan. 29, 1946 |
| 2,654,610 | De Vlieg | Oct. 6, 1953 |
| 2,832,248 | Steele | Apr. 29, 1958 |
| 2,838,316 | Thomas | June 10, 1958 |